United States Patent
Murphy et al.

(10) Patent No.: US 12,014,096 B1
(45) Date of Patent: Jun. 18, 2024

(54) SYSTEM AND METHOD FOR REMOTE AUTHENTICATION BASED ON COMPUTER-VISION TECHNOLOGIES

(71) Applicant: Bank of America Corporation, Charlotte, NC (US)

(72) Inventors: Timothy Scott Murphy, Charlotte, NC (US); Paul Martin Mattison, Sherrills Ford, NC (US)

(73) Assignee: Bank of America Corporation, Charlotte, NC (US)

( * ) Notice: Subject to any disclaimer, the term of this patent is extended or adjusted under 35 U.S.C. 154(b) by 0 days.

(21) Appl. No.: 18/467,216

(22) Filed: Sep. 14, 2023

(51) Int. Cl.
   *G06F 3/12* (2006.01)
(52) U.S. Cl.
   CPC .......... *G06F 3/1238* (2013.01); *G06F 3/1222* (2013.01); *G06F 3/1288* (2013.01)
(58) Field of Classification Search
   None
   See application file for complete search history.

(56) References Cited

U.S. PATENT DOCUMENTS

| | | | |
|---|---|---|---|
| 7,590,852 B2 | 9/2009 | Hatter et al. | |
| 7,734,925 B2 | 6/2010 | Ross et al. | |
| 8,190,904 B2 | 5/2012 | Hatter et al. | |
| 9,270,758 B2 | 2/2016 | Shanmugam et al. | |
| 9,646,150 B2 | 5/2017 | Toth | |
| 9,911,098 B2 | 3/2018 | Hackler et al. | |
| 10,009,332 B2 | 6/2018 | Livesay et al. | |
| 10,127,378 B2 | 11/2018 | Toth | |
| 10,885,227 B2 | 1/2021 | Szymanski et al. | |
| 10,887,098 B2 | 1/2021 | Van Der Velden et al. | |
| 11,523,087 B2 | 12/2022 | Taylor et al. | |
| 2009/0049298 A1 | 2/2009 | Hatter et al. | |
| 2012/0036081 A1 | 2/2012 | Hatter et al. | |
| 2014/0268243 A1* | 9/2014 | Mitsubori | H04N 1/00938 358/402 |
| 2014/0354758 A1 | 12/2014 | Spence | |
| 2016/0127609 A1* | 5/2016 | Moritani | H04N 1/442 358/1.14 |
| 2018/0108101 A1* | 4/2018 | Rodriguez | G06K 7/1417 |
| 2018/0218339 A1* | 8/2018 | Jenkins | G06Q 30/018 |
| 2019/0031994 A1 | 1/2019 | Tanaka et al. | |
| 2021/0033070 A1 | 2/2021 | Yang | |

\* cited by examiner

*Primary Examiner* — Thomas D Lee

(57) ABSTRACT

A system for remote authentication accesses a scanned copy of a first document, images, and signatures associated with a requesting user, converts the scanned copy to a digital document, determines a subject matter associated with the first document based on an analysis of the digital document by natural language processing and machine-learning models, selects a first authenticator from multiple authenticators based on the subject matter, a timestamp of the authentication session, and an authenticator profile of the first authenticator, establishes a video communication session between the first authenticator and the requesting user via a display screen via networks, and instructs a printer to generate a physical copy of an authenticated first document including a first authentication certificate of the first authenticator upon determining the first document is authenticated by the first authenticator.

20 Claims, 3 Drawing Sheets

SYSTEM AND METHOD FOR REMOTE AUTHENTICATION BASED ON COMPUTER-VISION TECHNOLOGIES

TECHNICAL FIELD

The present disclosure relates generally to remote authentication, and more specifically, to a system and method for remote authentication based on computer-vision technologies.

BACKGROUND

Documents are authenticated to deter prohibited actions and to ensure they are properly executed. To authenticate a document, an authenticator identifies users to screen out impostors and to make sure they have entered into agreements knowingly and willingly. However, requiring authenticators to be physically present with the users whenever they need documents to be authenticated is inefficient. In addition, the current authentication process is highly manual and subject to an authenticator's subjective evaluation.

SUMMARY

The system disclosed in the present application provides a technical solution to the problems discussed above by using artificial intelligence and machine learning to provide a remote authentication process where relevant evidence and logs are kept up to date. Currently, document authentications require trained authenticators be locally present when users request authentications for their documents. In addition, current authentication processes are highly manual, including maintaining physical logs manually. To address the limitations of current authentication processes, the disclosed system uses artificial intelligence at a frontend device to scan a document and perform data extraction on the scanned document. A backend server of the disclosed system then uses authentication rules to determine if the document is eligible for authentication by an authenticator. Upon determining the eligibility, the backend server selects a suitable authenticator from many authenticators and connects the selected authenticator with the requesting user in a video communication session that is displayed on the frontend device. Once the authenticator authenticates the document, the frontend device can generate a physical copy of the authenticated document with the authenticator's authentication certificate. The disclosed system can further generate a digital logging of the authentication on the digital log of the authenticator.

In one embodiment, the disclosed system for remote authentication includes a frontend device and backend server. The frontend device comprises a display screen, one or more cameras configured to capture visual data in a field of view of the frontend device, a scanner configured to scan documents, a printer configured to print authenticated documents, a first memory operable to store a plurality of authentication certificates associated with a plurality of authenticators, respectively, and a first processor operably coupled to the one or more cameras, the scanner, the printer, and the first memory. During an authentication session, the first processor is configured to access a scanned copy of a first document associated with a requesting user, and transmit the scanned copy of the first document to the backend server via one or more networks. The first processor is then configured to access one or more images associated with the requesting user and the first document from the one or more cameras. The first processor is then configured to transmit the one or more accessed images to the backend server via the one or more networks. The first processor is also configured to access one or more signatures associated with the requesting user. The first processor is then configured to transmit the one or more signatures to the backend server via the one or more networks. The first processor is further configured to instruct the printer to generate a physical copy of an authenticated first document comprising a first authentication certificate associated with a first authenticator upon determining the first document is authenticated by the first authenticator.

The backend server comprises a second memory operable to store a plurality of authenticator profiles with each authenticator profile being associated with a corresponding authenticator of a plurality of authenticators and a second processor operably coupled to the second memory. During the authentication session, the second processor is configured to receive the scanned copy of the first document, the one or more images, and the one or more signatures from the frontend device via the one or more networks. The second processor is then configured to convert the scanned copy of the first document to a digital document. The second processor is then configured to determine a subject matter associated with the first document based on an analysis of the digital document by natural language processing and one or more machine-learning models. The second processor is also configured to select the first authenticator from the plurality of authenticators based on the subject matter associated with the first document, a timestamp associated with the authentication session, and an authenticator profile associated with the first authenticator. The second processor is further configured to establish, via the one or more networks, a video communication session between the first authenticator and the requesting user via the display screen of the frontend device.

The system for remote authentication further comprises a plurality of authenticator-devices associated with the plurality of authenticators. The second processor is further configured to transmit, to a first authenticator-device associated with the first authenticator, an authentication request of the first document. The authentication request comprises the digital copy of the first document and information associated with the requesting user and the authentication session. The second processor is then configured to receive, from the first authentication-device, a confirmation of accepting the authentication request of the first document by the first authenticator. The second processor is further configured to establish the video communication session between the first authenticator and the requesting user via the display screen of the frontend device by connecting the first authentication-device with the frontend device via the one or more networks. The first processor is then configured to receive, from the first authenticator-device, an indication that the first authenticator has authenticated the first document. In one embodiment, the second processor is further configured to select the first authenticator from the plurality of authenticators further based on a state associated with the authentication session.

In one embodiment, the requesting user is co-located with one or more witness users. The second processor is further configured to identify, from the one or more images, a first identification associated with the requesting user and one or more second identifications associated with the one or more witness users, respectively. The second processor is then configured to determine, based on visual analyses of the first identification and the one or more second identifications by one or more first machine-learning models, an authenticity for each of the first and second identifications. The second processor is further configured to verify, based on one or more second machine-learning models, a first match between the requesting user and the first identification and one or more second matches between the one or more witness users and the respective one or more second identifications. In some embodiments, the second processor is configured to determine, based on the one or more images by one or more machine-learning models, one or more emotions associated with the requesting user and witness users. The second processor is further configured to determine, based on the one or more emotions associated with the request user and witness users, whether any of the request user and witness users has been coerced.

In one embodiment, the requesting user is remote from one or more witness users. The second processor is further configured to add the one or more witness users to the video communication session by connecting one or more user devices associated with the one or more witness users with the frontend device and the first authenticator-device.

The system for remote authentication further comprises a microphone and a speaker associated with the frontend device. The first processor is further configured to receive, via the microphone, one or more speech signals from the requesting user, and transmit the one or more speech signals to the backend server via the one or more networks. The second processor is further configured to detect, based on one or more first machine-learning models, one or more questions of the requesting user from the one or more speech signals. The second processor is then configured to generate, based on one or more second machine-learning models, one or more responses to one or more of the questions. The second processor is further configured to present, via the speaker or the display screen associated with the frontend device, the one or more responses.

In one embodiment, the second memory is further operable to store a plurality of digital logs associated with the plurality of authenticators, respectively. The second processor is further configured to, upon determining the first authenticator has authenticated the first document, generate an authentication entry in a first digital log associated with the first authenticator. As an example and not by way of limitation, the authentication entry comprises information associated with the authentication session of the first document.

The system for remote authentication further comprises a plurality of label printers associated with the plurality of authenticators, respectively. The second processor is further configured to, upon determining the first authenticator has authenticated the first document, instruct a first label printer associated with the first authenticator to print an authentication label configured for being attached to a first physical log associated with the first authenticator. As an example and not by way of limitation, the authentication label comprises information associated with the authentication session of the first document.

The system for remote authentication further comprises a signature capture pad associated with the frontend device. The signature capture pad is configured to capture signatures. The first processor is further configured to access the one or more signatures from the signature capture pad.

In one embodiment, accessing the one or more signatures comprises detecting the one or more signatures from the one or more images based at least in part on optical character recognition. In one embodiment, the first authentication certificate comprises one or more of an ink stamp or an embossing seal.

In one embodiment, the second processor is further configured to determine one or more second authenticators of the plurality of authenticators have terminated their associations with the system. The second processor is then configured to instruct the first memory to update the plurality of authentication certificates by deleting one or more second authentication certificates associated with the one or more second authenticators.

In one embodiment, the second processor is further configured to determine an eligibility of the first document for authentication based on one or more authentication rules.

The disclosed system and methods provide the practical application of intelligently and securely authenticating documents in a remote manner by using artificial intelligence and machine learning to analyze the documents, information associated with the requesting user, the witness users, and authenticators, and facilitating authentications of the documents accordingly. As described in embodiments of the present disclosure, a frontend device scans a document and performs data extraction on the scanned document. A backend server then uses authentication rules to determine if the document is eligible for authentication by an authenticator. Upon determining the eligibility, the backend server selects a suitable authenticator from many authenticators and connects the selected authenticator with the requesting user in a video communication session that is displayed on the frontend device. The backend server further determines the authenticity of the requesting user and witness user(s) and rules out coercion before establishing a video communication session between the users and the authenticator. Once the authenticator authenticates the document, the frontend device generates a physical copy of the authenticated document with the authenticator's authentication certificate.

By effectively determining the eligibility of a document for authentication, the disclosed system and methods help save network and computing resources as there are no further data transmissions over the network and no further data processing using the disclosed system after a document is determined to be ineligible for authentication. This helps to alleviate bottlenecks in the network and to conserve processing resources. By establishing a link between the frontend device and the first authenticator's authenticator-device, the disclosed system and methods help further save network and computing resources as the link is more efficient for network resources of the network and computing resources of the backend server. By verifying the authenticity of requesting users and witness users and preventing documents to be authenticated when there is potential coercion, the disclosed system and methods improve network security as the network can be protected from unauthorized access or misuse, thereby creating a secure environment for users and devices to perform authentications.

Thus, the disclosed system and methods generally improve the technology associated with a computing infrastructure.

Certain embodiments of the present disclosure may include some, all, or none of these advantages. These advantages and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description.

DETAILED DESCRIPTION

Figure 1:
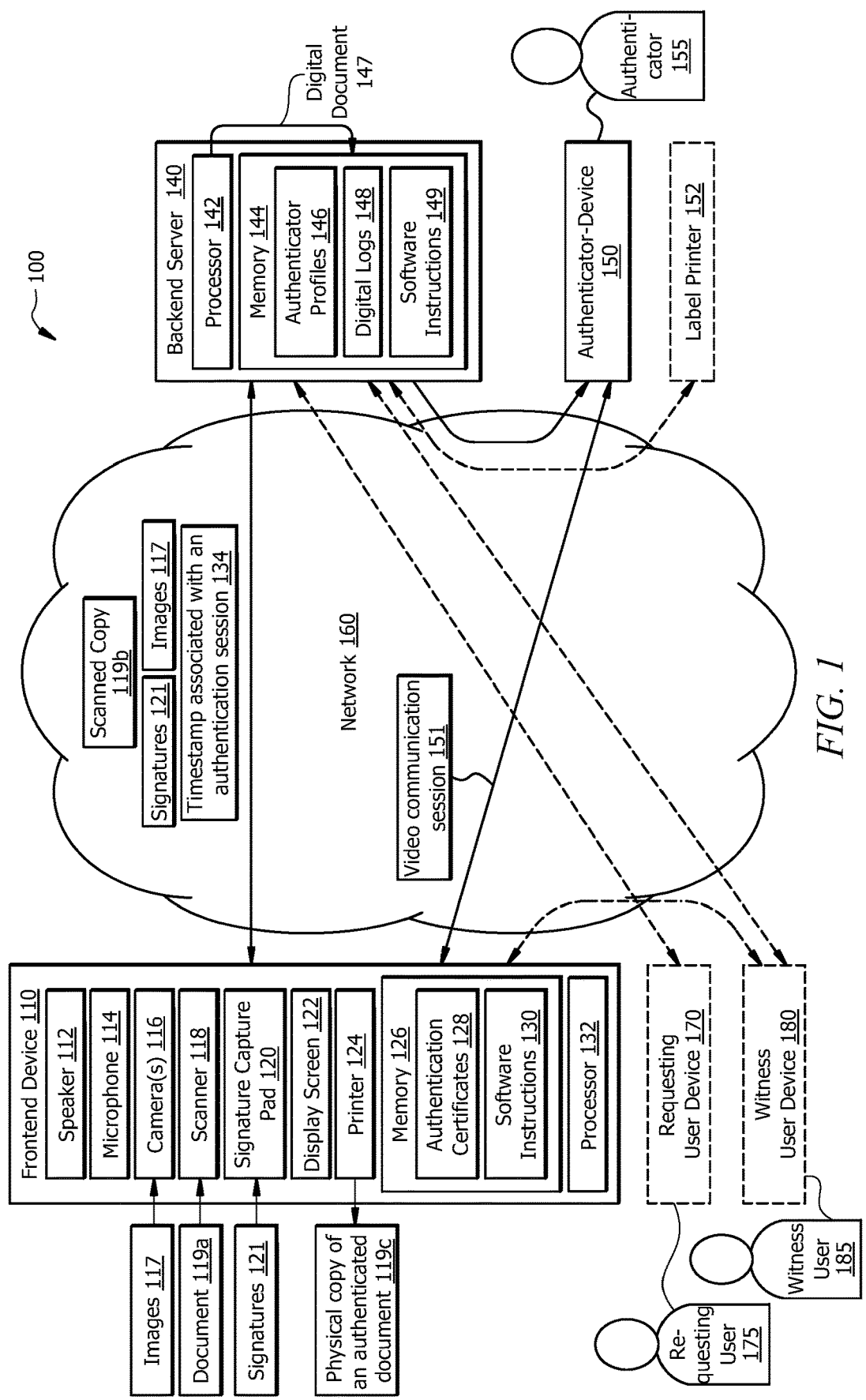
FIG. 1 illustrates one embodiment of a system configured to conduct remote authentication of documents.
Figure 2A:
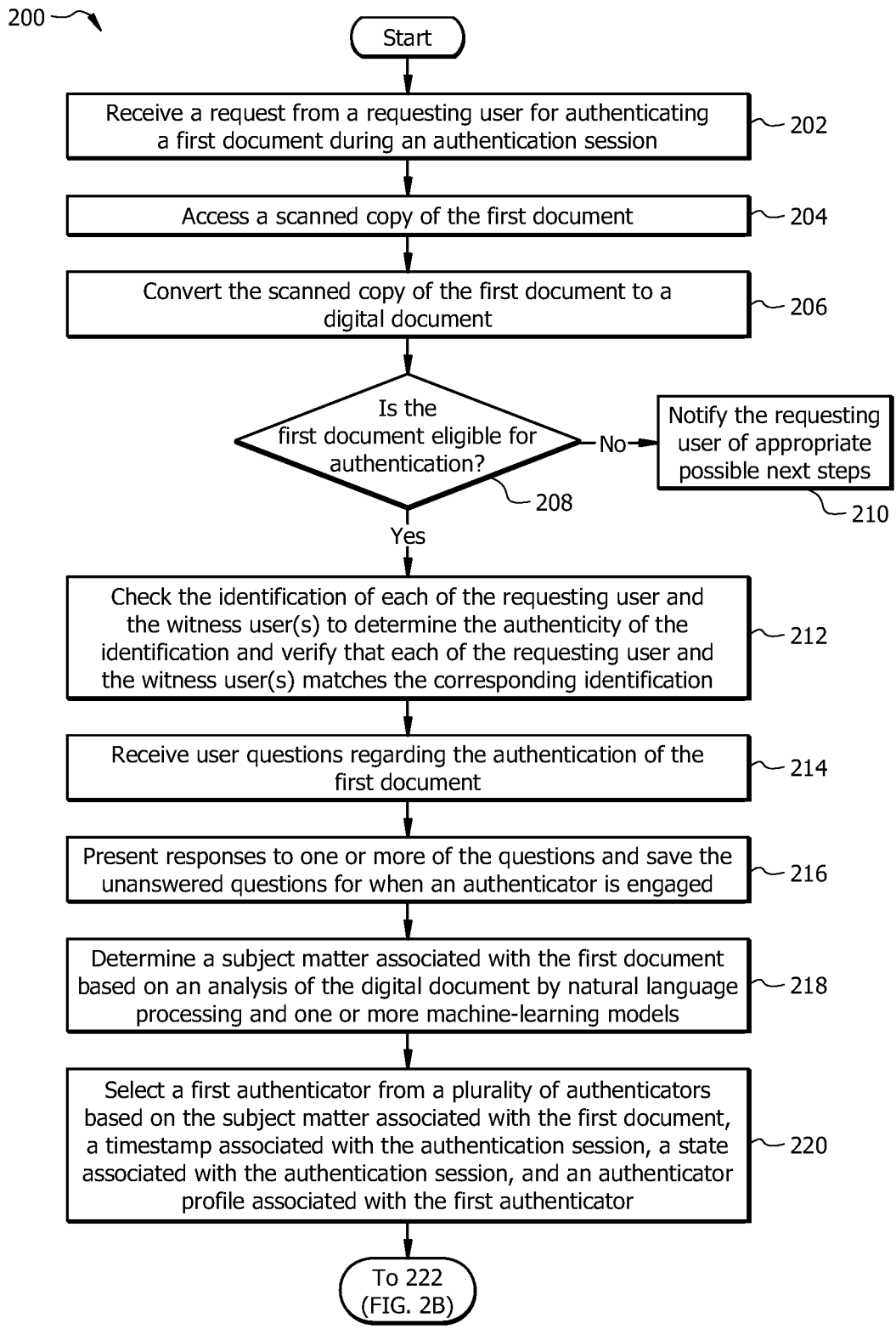
FIGS. 2A-2B illustrate an example flowchart of a method for conducting remote authentication of documents.
Figure 2B:
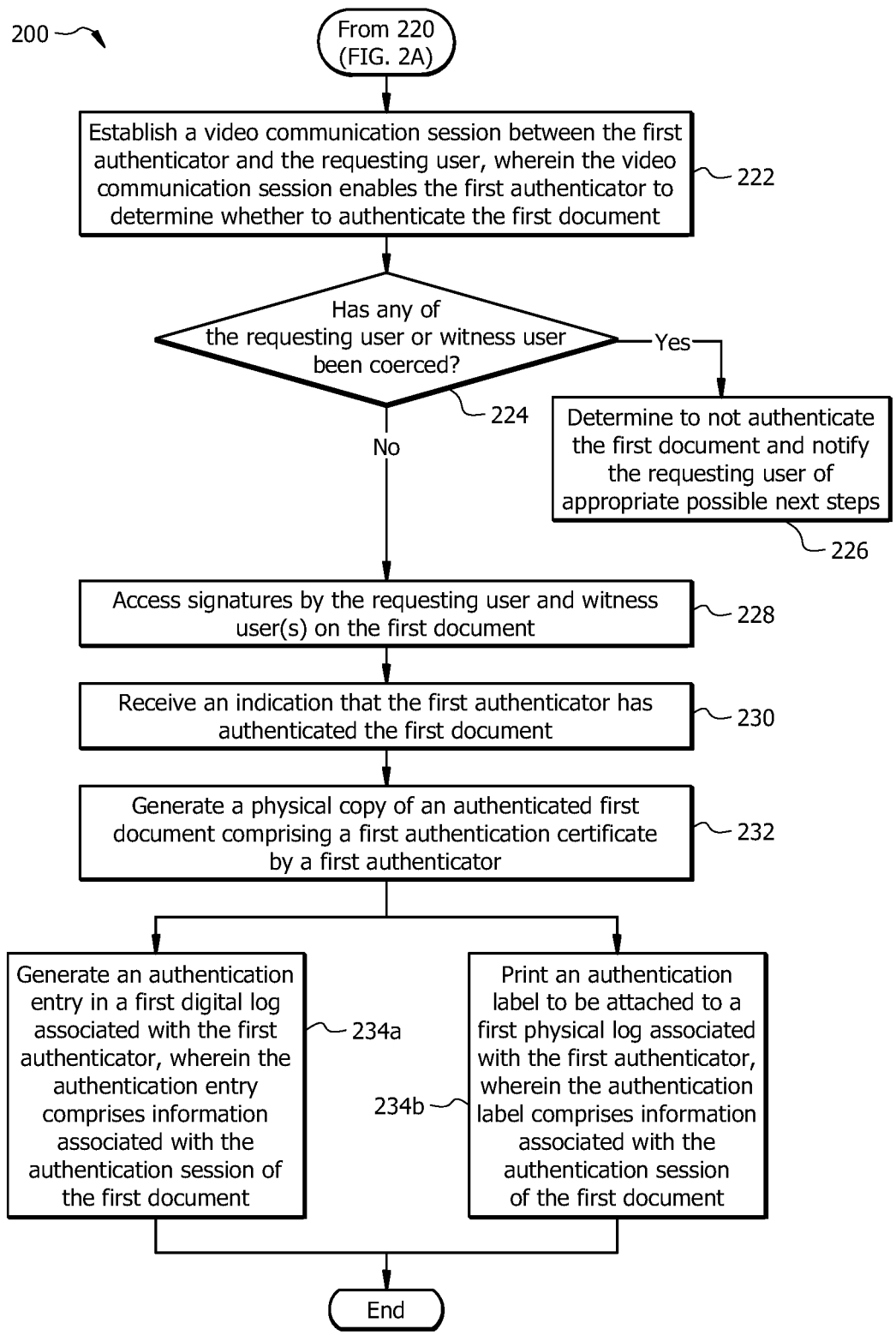

As described above, previous technologies fail to efficiently and effectively conduct remote authentications. This disclosure provides various systems and methods to efficiently and effectively conduct remote authentications using artificial intelligence and computer-vision technologies in a secured networking environment. FIG. 1 illustrates a system 100 configured to conduct remote authentications. FIGS. 2A-2B illustrate a method 200 configured to conduct remote authentications.

Example System for Conducting Remote Authentication

FIG. 1 illustrates one embodiment of a system 100 that is configured to conduct remote authentication of documents. In one embodiment, system 100 comprises a frontend device 110 which may be used by users for the purpose of remote authentication of documents. In some embodiments, system 100 further comprises a backend server 140 which may utilize artificial intelligence and computer-vision technologies to determine the eligibility of a document 119a to be authenticated, authenticate user identities, select a suitable authenticator 155, establish an authentication session between a requesting user 175 and the selected authenticator 155, and perform all other relevant functions associated with the remote authentication. In some embodiments, system 100 further comprises a network 160, which enables communications among components of the system 100. In some embodiments, system 100 further comprises an authenticator-device 150, which may be used by an authenticator 155 to join the established authentication session.

In alternative embodiments, system 100 may comprise a requesting user device 170, which may enable the requesting user 175 to submit the document 119a to be authenticated electronically. In alternative embodiments, system 100 may further comprise a witness user device 180, which may enable a witness user 185 to witness the authentication session remotely. In alternative embodiments, system 100 may additionally comprise a label printer 152 associated with an authenticator 155, which may be used by the backend server 140 to print log entries to the authenticator's log. Although FIG. 1 illustrates a particular number of frontend device 110, backend server 140, authenticator-device 150, label printer 152, network 160, requesting user device 170, and witness user device 180, this disclosure contemplates any suitable number of frontend device 110, backend server 140, authenticator-device 150, label printer 152, network 160, requesting user device 170, and witness user device 180. For example, system 100 may comprise more than one frontend device 110, backend server 140, authenticator-device 150, label printer 152, network 160, requesting user device 170, and witness user device 180. In other embodiments, system 100 may not have all of the components listed and/or may have other elements instead of, or in addition to, those listed above.

Frontend device 110 comprises a processor 132 in signal communication with a memory 126. Memory 126 stores software instructions 130 that when executed by the processor 132, cause the processor 132 to perform one or more functions described herein. For example, when the software instructions 130 are executed, the processor 132 executes the software instructions 130 to: 1) access a scanned copy 119b of a first document 119a associated with a requesting user 175, and transmit the scanned copy 119b of the first document 119a to a backend server 140 via one or more networks 160; 2) access one or more images 117 associated with the requesting user 175 and the first document 119a from the one or more cameras 116; 3) transmit the one or more accessed images 117 to the backend server 140 via the one or more networks 160; 4) access one or more signatures 121 associated with the requesting user 175; 5) transmit the one or more signatures 121 to the backend server 140 via the one or more networks 160; and 6) instruct the printer 124 to generate a physical copy of an authenticated first document 119c comprising a first authentication certificate associated with a first authenticator 155 upon determining the first document 119a is authenticated by the first authenticator 155.

Backend server 140 comprises a processor 142 in signal communication with a memory 144. Memory 144 stores software instructions 149 that when executed by the processor 142, cause the processor 142 to perform one or more functions described herein. For example, when the software instructions 149 are executed, the processor 142 executes the software instructions 149 to: 1) receive the scanned copy 119b of the first document 119a, the one or more images 117, and the one or more signatures 121 from the frontend device 110 via the one or more networks 160; 2) convert the scanned copy 119b of the first document 119a to a digital document 147; 3) determine a subject matter associated with the first document 119a based on an analysis of the digital document 147 by natural language processing and one or more machine-learning models; 4) select the first authenticator 155 from the plurality of authenticators 155 based on the subject matter associated with the first document 119a, a timestamp associated with the authentication session 134, and an authenticator profile 146 associated with the first authenticator 155; and 5) establish, via the one or more networks 160, a video communication session 151 between the first authenticator 155 and the requesting user 175 via the display screen 122 of the frontend device 110.

System Components

Frontend Device

Examples of the frontend device 110 include, but are not limited to, a computer, a laptop, a mobile device (e.g., smart phones or tablets), a client device, an ATM machine, a kiosk, or any other suitable type of device. The frontend device 110 is generally configured to perform operations described further below in conjunction with the method 200 described in FIGS. 2A-2B.

In one embodiment, the frontend device includes a speaker 112, a microphone 114, one or more camera(s) 116 configured to capture visual data (i.e., images or videos) in a field of view of the frontend device 110, a scanner 118, a signature capture pad 120 configured to capture signatures 121, a display screen 122, a printer 124, a memory 126 comprising authentication certificates 128 and software instructions 130, and a processor 132. The processor 132 is in signal communication with a network interface associated with the network 160 and memory 126. The frontend device 110 may be configured as shown, or in any other configuration.

The processor 132 is any electronic circuitry, including, but not limited to, state machines, one or more central processing unit (CPU) chips, logic units, cores (e.g., a multi-core processor), field-programmable gate arrays (FPGAs), application-specific integrated circuits (ASICs), or digital signal processors (DSPs). The processor 132 may be a programmable logic device, a microcontroller, a microprocessor, or any suitable combination of the preceding. The processor 132 is communicatively coupled to and in signal communication with a network interface associated with network 160 and memory 126. The one or more processors 132 are configured to process data. For example, the processor 132 may be 8-bit, 16-bit, 32-bit, 64-bit or of any other suitable architecture. The processor 132 may include an arithmetic logic unit (ALU) for performing arithmetic and logic operations, processor registers that supply operands to the ALU and store the results of ALU operations, and a control unit that fetches software instructions 130 from memory 126 and executes them by directing the coordinated operations of the ALU, registers and other components. The one or more processors 132 are configured to implement various software instructions 130. For example, the one or more processors 132 are configured to execute software instructions 130 to implement the functions disclosed herein, such as some or all of those described with respect to FIGS. 1-2. In some embodiments, the function described herein is implemented using logic units, FPGAs, ASICs, DSPs, or any other suitable hardware or electronic circuitry.

Memory 126 may be volatile or non-volatile and may comprise a read-only memory (ROM), random-access memory (RAM), ternary content-addressable memory (TCAM), dynamic random-access memory (DRAM), and static random-access memory (SRAM). Memory 126 may be implemented using one or more disks, tape drives, solid-state drives, and/or the like. Memory 126 is operable to store a plurality of authentication certificates associated with a plurality of authenticators, respectively and the software, and/or any other data or software instructions 130. The software instructions 130 may comprise any suitable set of instructions, logic, rules, or code operable to execute the processor 132.

In an example scenario, assume that a requesting user 175 wants to authenticate a document 119a (e.g., notarize a document 119a). The requesting user 175 can interact with the frontend device 110 (e.g., an ATM/kiosk) during an authentication session (e.g., a notary session) for a document 119a. For example, the requesting user 175 can book timeslots at the frontend device 110, load documents 119a at the frontend device 110, show proper identification to the frontend device 110, ask the frontend device 110 questions or concerns, e.g., regarding the notarization of the document 119a, receive answers from the frontend device 110, have a video meeting 151 with an authenticator 155 (e.g. a notary) via the frontend device 110, provide verbal confirmations to the frontend device 110, sign the document in front of or at the frontend device 110, and receive the authenticated document 119c (e.g., notarized document with the notary's seal, such as an electronic or digital seal) from the frontend device 110.

Backend Server

The backend server 140 is generally any device that is configured to process data and communicate with computing devices (e.g., frontend device 110, authenticator-device 150, label printer 152, requesting user device 170, or witness user device 180), databases, systems, etc., via the network 160. The backend server 140 is generally configured to perform operations described further below in conjunction with the method 200 described in FIGS. 2A-2B.

The backend server 140 comprises the processor 142 in signal communication with a network interface associated with network 160 and memory 144. The backend server 140 may be configured as shown, or in any other configuration.

Processor 142 comprises one or more processors operably coupled to the memory 144. The processor 142 is any electronic circuitry, including, but not limited to, state machines, one or more central processing unit (CPU) chips, logic units, cores (e.g., a multi-core processor), field-programmable gate arrays (FPGAs), application-specific integrated circuits (ASICs), or digital signal processors (DSPs). The processor 142 may be a programmable logic device, a microcontroller, a microprocessor, or any suitable combination of the preceding. The processor 142 is communicatively coupled to and in signal communication with a network interface associated with network 160 and memory 144. The one or more processors 142 are configured to process data. For example, the processor 142 may be 8-bit, 16-bit, 32-bit, 64-bit or of any other suitable architecture. The processor 142 may include an arithmetic logic unit (ALU) for performing arithmetic and logic operations, processor registers that supply operands to the ALU and store the results of ALU operations, and a control unit that fetches software instructions 149 from memory 144 and executes them by directing the coordinated operations of the ALU, registers and other components. The one or more processors 142 are configured to implement various software instructions 149. For example, the one or more processors 142 are configured to execute software instructions 149 to implement the functions disclosed herein, such as some or all of those described with respect to FIGS. 1-2. In some embodiments, the function described herein is implemented using logic units, FPGAs, ASICs, DSPs, or any other suitable hardware or electronic circuitry.

Memory 144 may be volatile or non-volatile and may comprise a read-only memory (ROM), random-access memory (RAM), ternary content-addressable memory (TCAM), dynamic random-access memory (DRAM), and static random-access memory (SRAM). Memory 144 may be implemented using one or more disks, tape drives, solid-state drives, and/or the like. Memory 144 is operable to store a plurality of authenticator profiles 146, each authenticator profile 146 associated with a corresponding authenticator of a plurality of authenticators, a plurality of digital logs 148 associated with the plurality of authenticators, respectively, and the software, and/or any other data or software instructions 149. The software instructions 149 may comprise any suitable set of instructions, logic, rules, or code operable to execute the processor 142.

Continuing with the aforementioned scenario where the requesting user 175 wants to authenticate a document 119a. The backend server 140 processes the request, performs different operations associated with the authentication session, and generates responses for different stages of the authentication session. For example, the backend server 140 determines if the document 119a is eligible for authentication, determines the authenticity of the requesting user 175 and witness user(s) 185, selects and engages a suitable authenticator 155, and generates an entry in the digital log 148 of the authenticator 155. The backend server 140 may additionally guarantee the data security of the authenticators 155 by destroying the authentication certificate when an authenticator 155 is no longer affiliated with the system 100. In some embodiments, the processor 142 determines one or more second authenticators 155 of the plurality of authenticators 155 have terminated their associations with the system 100. The processor 142 then instructs the first memory 126 to update the plurality of authentication certificates 128 by deleting one or more second authentication certificates 128 associated with the one or more second authenticators 155.

Authenticator-Devices

Examples of authenticator-devices 150 include, but are not limited to, computers, laptops, mobile devices (e.g., smart phones or tablets), servers, clients, or any other suitable type of device. An authenticator-device 150 is generally configured to send data and instructions for processing the data to the frontend device 110 and backend server 140. For example, the data may comprise a confirmation to accept the authentication request, questions to the requesting user 175 and witness user(s) 185, and signatures by the authenticator 155. The instructions may specify where the authenticator's signatures or authentication certificate 128 should be applied on the document 119c. In other examples, the data may comprise any suitable type of data. The instructions may comprise any suitable type or number of commands for processing the data. The authenticator-device 150 is further configured to execute a video authentication session 151 with the requesting user 175 and witness user(s) 185 via one or more of the frontend device 110, requesting user device 170, or witness user device 180.

Label Printers

In alternative embodiments, the system 100 may further comprise a plurality of label printers 152 associated with a plurality of authenticators 155, respectively. If an authentication entry is needed in a physical log that is located with an authenticator 155, the backend server 140 may instruct a label printer 152 to print a label with the appropriate information, so that the authenticator 155 can update a physical log if they like.

Network

Network 160 may be any suitable type of wireless and/or wired network, including, but not limited to, all or a portion of the Internet, an Intranet, a private network, a public network, a peer-to-peer network, the public switched telephone network, a cellular network, a local area network (LAN), a metropolitan area network (MAN), a wide area network (WAN), and a satellite network. The network 160 may be configured to support any suitable type of communication protocol as would be appreciated by one of ordinary skill in the art.

Requesting User Device

In alternative embodiments, the system 100 may further comprise a requesting user device 170. Examples of a requesting user device 170 include, but are not limited to, a computer, a laptop, a mobile device (e.g., smart phones or tablets), a server, a client, or any other suitable type of device. The requesting user device 170 is generally configured to send data and instructions for processing the data to the backend server 140. For example, the requesting user 175 can use the requesting user device 170 to take a picture of each page of the document 119a to be authenticated and upload them to the backend server 140 via the network 160.

Witness User Device

In alternative embodiments, the system 100 may further comprise one or more witness user devices 180 associated with one or more witness users 185, respectively. Examples of a requesting user device 180 include, but are not limited to, a computer, a laptop, a mobile device (e.g., smart phones or tablets), a server, a client, or any other suitable type of device. The witness user device 180 is generally configured to send data and instructions for processing the data to the frontend device 110, backend server 140, or authenticator-devices 150. In an example scenario, the requesting user 175 is remote from one or more witness users 185. Accordingly, the backend server 140 can add the one or more witness users 185 to the video communication session 151 by connecting one or more user devices 180 associated with the one or more witness users 185 with the frontend device 110 and the first authenticator-device 150.

Example Method for Conducting Remote Authentication

FIGS. 2A-2B illustrate an example flowchart of a method 200 for conducting remote authentication of documents. Modifications, additions, or omissions may be made to method 200. Method 200 may include more, fewer, or other steps. For example, steps may be performed in parallel or in any suitable order. While at times discussed as the system 100, frontend device 110, backend server 140, processor 132, processor 142, or components of any of thereof performing steps, any suitable system or components of the system may perform one or more steps of the method 200. For example, one or more steps of method 200 may be implemented, at least in part, in the form of software instructions (e.g., software instructions 130 or software instructions 149 of FIG. 1), stored on non-transitory, tangible, machine-readable media (e.g., memory 126 or memory 144 of FIG. 1) that when run by one or more processors (e.g., processor 132 or processor 142 of FIG. 1) may cause the one or more processors to perform steps 202-234.

Now referring to FIG. 2A, after start, the processor 132 of the frontend device 110 receives a request from a requesting user 175 for authenticating a first document 119a during an authentication session at operation 202.

At operation 204, the processor 132 accesses a scanned copy 119b of the first document 119a. The scanned copy 119b of the first document 119a may be accessed from the scanner 118 of the frontend device 110. In particular embodiments, the processor 132 may transmit the scanned copy 119b of the first document 119a to the backend server 140 via one or more networks 160.

At operation 206, the processor 142 of the backend server 140 converts the scanned copy 119b of the first document 119a to a digital document 119c.

At operation 208, the processor 142 determines whether the first document 119a is eligible for authentication. In particular embodiments, the processor 142 may determine the eligibility of the first document 119a for authentication based on one or more authentication rules. If the first document 119a is not eligible for authentication, the processor 132 may notify the requesting user 175 of appropriate possible next steps at operation 210, e.g., via the display screen 122. As a result, the embodiments disclosed herein may have a technical advantage of saving network and computing resources as there are no further data transmission over the network 160 and data processing using the frontend device 110 and backend server 140 after a document 119a is determined to be ineligible for authentication.

If the first document 119a is eligible for authentication, the method proceeds to operation 212. At operation 212, the processor 142 checks the identification of each of the requesting user 175 and the witness user(s) 185 to determine the authenticity of the identification and verifies that each of the requesting user 175 and the witness user(s) 185 matches the corresponding identification. In particular embodiments, the requesting user 175 is co-located with one or more witness users 185. The processor 142 may identify, from one or more images captured by the camera(s) 116 of the frontend device 110, a first identification associated with the requesting user 175 and one or more second identifications associated with the one or more witness users 185, respectively. The processor 142 may then determine, based on visual analyses of the first identification and the one or more second identifications by one or more first machine-learning models, an authenticity for each of the first and second identifications. As an example and not by way of limitation, the first machine-learning models may be trained for authenticity detection. The processor 142 may further verify, based on one or more second machine-learning models, a first match between the requesting user 175 and the first identification and one or more second matches between the one or more witness users 185 and the respective one or more second identifications. As an example and not by way of limitation, the second machine-learning models may be trained for facial recognition. As a result, the embodiments disclosed herein may have a technical advantage of improved network security as the network 160 may be protected from unauthorized access or misuse, thereby creating a secure environment for users and devices to perform authentications.

At operation 214, the processor 132 receives user questions regarding the authentication of the first document 119a. In particular embodiments, the processor 132 may receive, via the microphone 114 of the frontend device 110, one or more speech signals from the requesting user 175, and transmit the one or more speech signals to the backend server 140 via the one or more networks 160. The processor 142 may then detect, based on one or more first machine-learning models, one or more questions of the requesting user 175 from the one or more speech signals. As an example and not by way of limitation, the first machine-learning models may be trained for voice recognition. The processor 142 may further generate, based on one or more second machine-learning models, one or more responses to one or more of the questions. As an example and not by way of limitation, the second machine-learning models may be trained for question and answering based on language models.

At operation 216, the processor 132 presents responses to one or more of the questions and save the unanswered questions for when an authenticator 155 is engaged. As an example and not by way of limitation, the processor 132 may present, via the speaker 112 or the display screen 122 of the frontend device 110, the one or more responses.

At operation 218, the processor 142 determines a subject matter associated with the first document 119a based on an analysis of the digital document 119c by natural language processing and one or more machine-learning models.

At operation 220, the processor 142 selects a first authenticator 155 from a plurality of authenticators 155 based on the subject matter associated with the first document 119a, a timestamp associated with the authentication session 134, a state associated with the authentication session, and an authenticator profile 146 associated with the first authenticator 155. As an example and not by way of limitation, the processor 142 may select an authenticator 155 whose authenticator profile 146 indicates the authenticator 155 is suitable for authenticating the subject matter associated with the first document 119a. As another example and not by way of limitation, if the timestamp 134 indicates the time is 5:30 PM Pacific Time, the processor 142 may select an authenticator 155 residing in the Pacific Time Zone instead of one residing in the Eastern Time Zone.

In particular embodiments, the processor 142 may transmit, to a first authenticator-device 150 associated with the first authenticator 155, an authentication request of the first document 119a. The authentication request may comprise the digital copy 119c of the first document 119a and information associated with the requesting user 175 and the authentication session. The processor 142 may then receive, from the first authenticator-device 150, a confirmation of accepting the authentication request of the first document 119a by the first authenticator 155.

The method then proceeds to operation 222, as illustrated in FIG. 2B.

Now referring to FIG. 2B, at operation 222, the processor 142 establishes, via the one or more networks 160, a video communication session 151 between the first authenticator 155 and the requesting user 175 via the display screen 122 of the frontend device 110 by connecting the first authenticator-device 150 with the frontend device 110 via the one or more networks 160. As a result, the embodiments disclosed herein may have a technical advantage of saving network and computing resources as a direction link is established between the frontend device 110 and the first authenticator's authenticator-device 150, which is more efficient for network resources of the network 160 and computing resources of the backend server 140.

After the video communication session 151 is established, the first authenticator 155 may be presented with any remaining questions and concerns of the requesting user 175 and then answer them. The first authenticator 155 may review the video of the unanswered questions and concerns, as well as the text log of the unanswered questions and concerns. As can be seen, since some questions and concerns are already answered using machine-learning models, the first authenticator 155 may spend less time answering questions and concerns, thereby saving the network resources.

At operation 224, the processor 142 determines whether any of the requesting user 175 or witness user 185 has been coerced. In one scenario, the requesting user 175 is co-located with one or more witness users 185. The processor 142 may determine, based on the one or more images 117 by one or more machine-learning models, one or more emotions associated with the requesting user 175 and witness users 185. As an example and not by way of limitation, the machine-learning models may be trained for emotion detection. The processor 142 may further determine, based on the one or more emotions associated with the request user 175 and witness users 185, whether any of the request user 175 and witness users 185 has been coerced. During this operation, the first authenticator 155 may ask for the verbal confirmation. The frontend device 110 may record each person giving the verbal confirmation, including the surrounding area. The frontend device 110 may ask to use emotional recognition software to help check for coercion. If agreed, the backend server 140 may use emotional recognition and analysis software to help determine if any of the requesting user 175 or witness users 185 have been coerced. Additionally, the frontend device 110 may scan the area for signs of other individuals who might be using coercion on the requesting user 175 or witness users 185. The findings about coercion may be given to the first authenticator 155 for review and retained systematically.

If any of the requesting user 175 or witness user 185 has been coerced, at operation 226, the processor 142 determines to not authenticate the first document 119a and notifies the requesting user 175 of appropriate possible next steps. As a result, the embodiments disclosed herein may have a technical advantage of improved network security as the network 160 may be protected from unauthorized access or misuse, thereby creating a secure environment for users and devices to perform authentications.

If none of the requesting user 175 or witness user 185 has been coerced, the processor 142 accesses one or more signatures 121 by the requesting user 175 and witness user(s) 185 on the first document 119a at operation 228. In one embodiment, the processor 132 may access the one or more signatures 121 from the signature capture pad 120 of the frontend device 110 and transmit the one or more signatures 121 to the backend server 140 via the one or more networks 160. In another embodiment, accessing the one or more signatures 121 may comprise detecting the one or more signatures 121 from the one or more images 117 based at least in part on optical character recognition. All requesting user 175 and witness users 185 should sign the document 119a in full view of the camera(s) 116 of the frontend device 110. The frontend device 110 may record all visual information. This signing may be on the signature lines of the physical document 119a or using the signature capture pad 120 of the frontend device 110. The requesting user 175 may then show each page signed to the camera(s) 116 for review by the backend server 140 and confirmation by the first authenticator 155. The backend server 140 may verify that the document pages shown match the document pages uploaded earlier.

At operation 230, the processor 132 receives an indication that the first authenticator 155 has authenticated the first document 119a from the first authenticator-device 150. For authentication, the first authenticator 155 may sign by clicking a mouse or writing their signature on a signature pad. The first authenticator 155 may also determine where on each document 119c that their signature and authentication certificate (e.g., seal) should be applied.

At operation 232, the processor 132 generates a physical copy (e.g., via the printer 124) of an authenticated first document 119c comprising a first authentication certificate by the first authenticator 155. As an example and not by way of limitation, the first authentication certificate may comprise one or more of an ink stamp or an embossing seal. If the first authentication certificate is an embossing seal, the frontend device 110 may use the printer 124 to emboss that seal onto the physical document 119c according to where the first authenticator 155 has determined their authentication certificate should be applied. If the authentication certificate is an ink stamp, the frontend device 110 may use the printer 124 to ink stamp the physical document 119c according to where the first authenticator 155 has determined their authentication certificate should be applied. The frontend device 110 may also use the printer 124 to print the first authenticator's signature on the document 119c according to where the first authenticator 155 has determined their signature should be applied.

Upon determining the first authenticator 155 has authenticated the first document 119a, the processor 142 may further perform the following operations. At operation 234a, the processor 142 generates an authentication entry in a first digital log 148 associated with the first authenticator 155. The authentication entry comprises information associated with the authentication session of the first document 119a. In alternative embodiment, at operation 234b, the processor 142 instructs a first label printer 152 associated with the first authenticator 155 to print an authentication label to be attached to a first physical log associated with the first authenticator 155. The authentication label comprises information associated with the authentication session of the first document 119a. Method 200 then ends.

In one example embodiment, method 200 may be applied to notarizing documents 119a. In a notary session (i.e., authentication session), a requesting user 175 may request the notarization of a document 119a via an ATM/kiosk (i.e., frontend device 110). By performing the operations described in method 200, the backend server 140 may connect the requesting user 175 with a notary (i.e., authenticator 155) to notarize the document 119a for the requesting user 175.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated with another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

To aid the Patent Office, and any readers of any patent issued on this application in interpreting the claims appended hereto, applicants note that they do not intend any of the appended claims to invoke 35 U.S.C. § 112(f) as it exists on the date of filing hereof unless the words "means for" or "step for" are explicitly used in the particular claim.

The invention claimed is:

1. A system for remote authentication, comprising:
a frontend device comprising:
 a display screen;
 one or more cameras configured to capture visual data in a field of view of the frontend device;
 a scanner configured to scan documents;
 a printer configured to print authenticated documents;
 a first memory operable to store a plurality of authentication certificates associated with a plurality of authenticators, respectively; and
 a first processor, operably coupled to the one or more cameras, the scanner, the printer, and the first memory, and configured to, during an authentication session:
  access a scanned copy of a first document associated with a requesting user, and transmit the scanned copy of the first document to a backend server via one or more networks;
  access one or more images associated with the requesting user and the first document from the one or more cameras;
  transmit the one or more accessed images to the backend server via the one or more networks;
  access one or more signatures associated with the requesting user;
  transmit the one or more signatures to the backend server via the one or more networks; and instruct the printer to generate a physical copy of an authenticated first document comprising a first authentication certificate associated with a first authenticator upon determining the first document is authenticated by the first authenticator; and the backend server comprising:
a second memory operable to store a plurality of authenticator profiles, each authenticator profile associated with a corresponding authenticator of a plurality of authenticators; and a second processor, operably coupled to the second memory, and configured to, during the authentication session:
receive the scanned copy of the first document, the one or more images, and the one or more signatures from the frontend device via the one or more networks;
convert the scanned copy of the first document to a digital document;
determine a subject matter associated with the first document based on an analysis of the digital document by natural language processing;
select the first authenticator from the plurality of authenticators based on the subject matter associated with the first document, a timestamp associated with the authentication session, and an authenticator profile associated with the first authenticator; and
establish, via the one or more networks, a video communication session between the first authenticator and the requesting user via the display screen of the frontend device.

2. The system of claim 1, further comprising a plurality of authenticator-devices associated with the plurality of authenticators, and wherein the second processor is further configured to:
transmit, to a first authenticator-device associated with the first authenticator, an authentication request of the first document, wherein the authentication request comprises the digital copy of the first document and information associated with the requesting user and the authentication session;
receive, from the first authenticator-device, a confirmation of accepting the authentication request of the first document by the first authenticator; and
establish the video communication session between the first authenticator and the requesting user via the display screen of the frontend device by connecting the first authenticator-device with the frontend device via the one or more networks.

3. The system of claim 1, wherein the first processor is further configured to:
receive, from the first authenticator-device, an indication that the first authenticator has authenticated the first document.

4. The system of claim 1, wherein the requesting user is co-located with one or more witness users, wherein the second processor is further configured to:
identify, from the one or more images, a first identification associated with the requesting user and one or more second identifications associated with the one or more witness users, respectively;
determine, based on visual analyses of the first identification and the one or more second identifications by one or more first machine-learning models, an authenticity for each of the first and second identifications; and verify, based on one or more second machine-learning models, a first match between the requesting user and the first identification and one or more second matches between the one or more witness users and the respective one or more second identifications.

5. The system of claim 1, wherein the requesting user is co-located with one or more witness users, wherein the second processor is further configured to:
determine, based on the one or more images by one or more machine-learning models, one or more emotions associated with the requesting user and witness users; and
determine, based on the one or more emotions associated with the requesting user and witness users, whether any of the requesting user and witness users has been coerced.

6. The system of claim 1, wherein the requesting user is remote from one or more witness users, wherein the second processor is further configured to:
add the one or more witness users to the video communication session by connecting one or more user devices associated with the one or more witness users with the frontend device and a first authenticator-device associated with the first authenticator.

7. The system of claim 1, further comprising a microphone and a speaker associated with the frontend device, where the first processor is further configured to:
receive, via the microphone, one or more speech signals from the requesting user, and transmit the one or more speech signals to the backend server via the one or more networks;
wherein the second processor is further configured to:
detect, based on one or more first machine-learning models, one or more questions of the requesting user from the one or more speech signals;
generate, based on one or more second machine-learning models, one or more responses to one or more of the questions; and
present, via the speaker or the display screen associated with the frontend device, the one or more responses.

8. The system of claim 1, wherein the second memory is further operable to store a plurality of digital logs associated with the plurality of authenticators, respectively, and wherein the second processor is further configured to:
upon determining the first authenticator has authenticated the first document, generate an authentication entry in a first digital log associated with the first authenticator, wherein the authentication entry comprises information associated with the authentication session of the first document.

9. The system of claim 1, further comprising a plurality of label printers associated with the plurality of authenticators, respectively, and wherein the second processor is further configured to:
upon determining the first authenticator has authenticated the first document, instruct a first label printer associated with the first authenticator to print an authentication label configured for being attached to a first physical log associated with the first authenticator, wherein the authentication label comprises information associated with the authentication session of the first document.

10. The system of claim 1, further comprising a signature capture pad associated with the frontend device, wherein the signature capture pad is configured to capture signatures, and wherein the first processor is further configured to:

access the one or more signatures from the signature capture pad.

11. The system of claim 1, wherein accessing the one or more signatures comprises detecting the one or more signatures from the one or more images based at least in part on optical character recognition.

12. The system of claim 1, wherein the first authentication certificate comprises one or more of an ink stamp or an embossing seal.

13. The system of claim 1, wherein the second processor is further configured to:
   determine one or more second authenticators of the plurality of authenticators have terminated their associations with the system; and
   instruct the first memory to update the plurality of authentication certificates by deleting one or more second authentication certificates associated with the one or more second authenticators.

14. The system of claim 1, wherein the second processor is further configured to:
   determine an eligibility of the first document for authentication based on one or more authentication rules.

15. The system of claim 1, wherein the second processor is further configured to select the first authenticator from the plurality of authenticators further based on a state associated with the authentication session.

16. A method comprising, by a computing system:
   accessing, during an authentication session, a scanned copy of a first document associated with a requesting user;
   accessing, during the authentication session, one or more images associated with the requesting user and the first document from one or more cameras associated with the computing system;
   accessing, during the authentication session, one or more signatures associated with the requesting user;
   converting, during the authentication session, the scanned copy of the first document to a digital document;
   determining, during the authentication session, a subject matter associated with the first document based on an analysis of the digital document by natural language processing and one or more machine-learning models;
   selecting, during the authentication session, a first authenticator from a plurality of authenticators based on the subject matter associated with the first document, a timestamp associated with the authentication session, and an authenticator profile associated with the first authenticator;
   establishing, via one or more networks, a video communication session between the first authenticator and the requesting user via a display screen associated with the computing system; and
   instructing a printer associated with the computing system to generate a physical copy of an authenticated first document comprising a first authentication certificate associated with the first authenticator upon determining the first document is authenticated by the first authenticator.

17. The method of claim 16, wherein the requesting user is co-located with one or more witness users, wherein the method further comprises:
   identifying, from the one or more images, a first identification associated with the requesting user and one or more second identifications associated with the one or more witness users, respectively;
   determining, based on visual analyses of the first identification and the one or more second identifications by one or more first machine-learning models, an authenticity for each of the first and second identifications; and
   verifying, based on one or more second machine-learning models, a first match between the requesting user and the first identification and one or more second matches between the one or more witness users and the respective one or more second identifications.

18. The method of claim 16, wherein the requesting user is co-located with one or more witness users, wherein the method further comprises:
   determining, based on the one or more images by one or more machine-learning models, one or more emotions associated with the requesting user and witness users; and
   determining, based on the one or more emotions associated with the requesting user and witness users, whether any of the requesting user and witness users has been coerced.

19. A non-transitory computer-readable medium storing instructions that when executed by a processor cause the processor to:
   access, during an authentication session, a scanned copy of a first document associated with a requesting user;
   access, during the authentication session, one or more images associated with the requesting user and the first document from one or more cameras associated with the processor;
   access, during the authentication session, one or more signatures associated with the requesting user;
   convert, during the authentication session, the scanned copy of the first document to a digital document;
   determine, during the authentication session, a subject matter associated with the first document based on an analysis of the digital document by natural language processing and one or more machine-learning models;
   select, during the authentication session, a first authenticator from a plurality of authenticators based on the subject matter associated with the first document, a timestamp associated with the authentication session, and an authenticator profile associated with the first authenticator;
   establish, via one or more networks, a video communication session between the first authenticator and the requesting user via a display screen associated with the processor; and
   instruct a printer associated with the processor to generate a physical copy of an authenticated first document comprising a first authentication certificate associated with the first authenticator upon determining the first document is authenticated by the first authenticator.

20. The non-transitory computer-readable medium of claim 19, wherein the requesting user is co-located with one or more witness users, wherein the instructions further cause the processor to:
   identify, from the one or more images, a first identification associated with the requesting user and one or more second identifications associated with the one or more witness users, respectively;
   determine, based on visual analyses of the first identification and the one or more second identifications by one or more first machine-learning models, an authenticity for each of the first and second identifications; and
   verify, based on one or more second machine-learning models, a first match between the requesting user and the first identification and one or more second matches between the one or more witness users and the respective one or more second identifications.

\* \* \* \* \*